(12) United States Patent
Eagland et al.

(10) Patent No.: US 7,202,300 B2
(45) Date of Patent: Apr. 10, 2007

(54) DISPERSION

(75) Inventors: Donald Eagland, West Yorkshire (GB); Nicholas John Crowther, West Yorksire (GB)

(73) Assignee: Advanced Gel Technology Limited, Bradford (GB)

( * ) Notice: Subject to any disclaimer, the term of this patent is extended or adjusted under 35 U.S.C. 154(b) by 0 days.

(21) Appl. No.: 10/515,589

(22) PCT Filed: Jun. 2, 2003

(86) PCT No.: PCT/GB03/02399

§ 371 (c)(1),
(2), (4) Date: Feb. 1, 2005

(87) PCT Pub. No.: WO03/102052

PCT Pub. Date: Dec. 11, 2003

(65) Prior Publication Data

US 2005/0124752 A1 Jun. 9, 2005

(30) Foreign Application Priority Data

May 31, 2002 (GB) .................... 0212528.4

(51) Int. Cl.
| C08F 246/00 | (2006.01) |
| C08F 2/06 | (2006.01) |
| C08F 112/32 | (2006.01) |
| C08F 116/34 | (2006.01) |
| C08F 2/48 | (2006.01) |
| C08L 57/00 | (2006.01) |

(52) U.S. Cl. .............. 524/503; 524/804; 524/808; 524/818; 522/6; 526/263; 526/265; 526/313; 526/315

(58) Field of Classification Search ............... 524/503, 524/804, 808; 526/263, 265; 522/6
See application file for complete search history.

(56) References Cited

FOREIGN PATENT DOCUMENTS

| EP | 1 251 240 A | 10/2002 |
| EP | 1 251 240 A3 | 3/2003 |
| GB | WO 98/12239 A * | 3/1998 |
| WO | WO 98 12239 A | 3/1998 |

* cited by examiner

Primary Examiner—Duane Smith
Assistant Examiner—Ives Wu
(74) Attorney, Agent, or Firm—Nixon & Vanderhye

(57) ABSTRACT

A method of preparing a dispersion which includes the step of contacting a first phase, a first material immiscible therewith, a first polymeric material and a second polymeric material wherein: (a) (i) said first polymeric material has a repeat unit of the formula (I), wherein A and B are the same or different, are selected from optionally-substituted aromatic and thereoaromatic groups and at least one comprises a relatively polar atom or group and $R^1$ and $R^2$ independently comprise relatively non-polar atoms or groups; (ii) said first polymeric material is prepared or preparable by providing a compound of general formula (I), wherein A, B, $R^1$ and $R^2$ are as described above, in an aqueous solvent and causing the groups C=C in said compound to react with one another to form said first polymeric material; (b) said second polymeric material includes a functional group which is able to react with said first polymeric material so that covalent bonds are formed between said first and second polymeric materials; (c) the ratio of the weight of said first polymeric material to the weight of said first phase is equal to or less than 0.0025; and (d) the ratio of the weight of said second polymeric material to the weight of said first phase is equal to or less than 0.035.

37 Claims, No Drawings

DISPERSION

This application is the U.S. National Phase of International Application PCT/GB03/02399, filed 2 Jun. 2003, which designated the U.S. PCT/GB03/02399 claims priority to British Application No. 0212528.4 filed 31 May 2002. The entire content of these applications are incorporated, herein by reference.

This invention relates to dispersions and provides a method of making dispersions and dispersions per se.

PCT/GB97/02529 describes a method of preparing a polymeric material, a polymeric material per se and preparation of gels using the polymeric material.

The present invention is based on the discovery of formulations of polymeric materials which have surprising properties, for example in the preparation of stable dispersions of materials such as water insoluble materials.

Thus, it is an object of the present invention to provide a polymeric material having useful properties.

According to a first aspect of the invention, there is provided a method of preparing a dispersion which includes the step of contacting a first phase, a first material immiscible therewith, a first polymeric material and a second polymeric material wherein:

(a) (i) said first polymeric material has a repeat unit of the formula

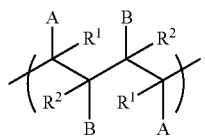

I wherein A and B are the same or different, are selected from optionally-substituted aromatic and heteroaromatic groups and at least one comprises a relatively polar atom or group and $R^1$ and $R^2$ independently comprise relatively non-polar atoms or groups; or (ii) said first polymeric material is prepared or preparable by providing a compound of general formula

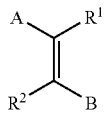

wherein A, B, $R^1$ and $R^2$ are as described above, in an aqueous solvent, (suitably so that molecules of said monomer aggregate) and causing the groups C=C in said compound to react with one another, (for example using UV radiation,) to form said first polymeric material;

(b) said second polymeric material includes a functional group which is able to react with said first polymeric material so that covalent bonds are formed between said first and second polymeric materials;

(c) the ratio of the weight of said first polymeric material to the weight of said first phase is equal to or less than 0.0025; and (d) the ratio of the weight of said second polymeric material to the weight of said first phase is equal to or less than 0.035.

A and/or B could be multi-cyclic aromatic or heteroaromatic groups. Preferably, A and B are independently selected from optionally-substituted five or more preferably six-membered aromatic and heteroaromatic groups. Preferred heteroatoms of said heteroaromatic groups include nitrogen, oxygen and sulphur atoms of which oxygen and especially nitrogen, are preferred. Preferred heteroaromatic groups include only one heteroatom. Preferably, a or said heteroatom is positioned furthest away from the position of attachment of the heteroaromatic group to the polymer backbone. For example, where the heteroaromatic group comprises a six-membered ring, the heteroatom is preferably provided at the 4-position relative to the position of the bond of the ring with the polymeric backbone.

Preferably, A and B represent different groups. Preferably, one of A or B represents an optionally-substituted aromatic group and the other one represents an optionally-substituted heteroaromatic group. Preferably A represents an optionally-substituted aromatic group and B represents an optionally-substituted heteroaromatic group especially one including a nitrogen heteroatom such as a pyridinyl group.

Unless otherwise stated, optionally-substituted groups described herein, for example groups A and B, may be substituted by halogen atoms, and optionally substituted alkyl, acyl, acetal, hemiacetal, acetalalkyloxy, hemiacetalalkyloxy, nitro, cyano, alkoxy, hydroxy, amino, alkylamino, sulphinyl, alkylsulphinyl, sulphonyl, alkylsulphonyl, sulphonate, amido, alkylamido, alkylcarbonyl, alkoxycarbonyl, halocarbonyl and haloalkyl groups. Preferably, up to 3, more preferably up to 1 optional substituents may be provided on an optionally substituted group.

Unless otherwise stated, an alkyl group may have up to 10, preferably up to 6, more preferably up to 4 carbon atoms, with methyl and ethyl groups being especially preferred.

Preferably, A and B each represent polar atoms or group that is, there is preferably some charge separation in groups A and B and/or groups A and B do not include carbon and hydrogen atoms only.

Preferably, at least one of A or B includes a functional group which can undergo a condensation reaction, for example on reaction with said second polymeric material. Preferably, A includes a said functional group which can undergo a condensation reaction.

Preferably, one of groups A and B includes an optional substituent which includes a carbonyl or acetal group with a formyl group being especially preferred. The other one of groups A and B may include an optional substituent which is an alkyl group, with an optionally substituted, preferably unsubstituted, $C_{1-4}$ alkyl group, for example a methyl group, being especially preferred.

Preferably, A represents a group, for example an aromatic group, especially a phenyl group, substituted (preferably at the 4-position relative to polymeric backbone when A represents an optionally-substituted phenyl group) by a formyl group or a group of general formula

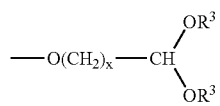

II where x is an integer from 1 to 6 and each $R^3$ is independently an alkyl or phenyl group or together form an alkalene group.

Preferably, B represents an optionally-substituted heteroaromatic group, especially a nitrogen-containing heteroaromatic group, substituted on the heteroatom with a hydrogen atom or an alkyl or aralkyl group. More preferably, B represents a group of general formula

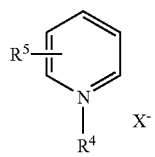

III wherein $R^4$ represents a hydrogen atom or an alkyl or aralkyl group, $R^5$ represents a hydrogen atom or an alkyl group and $X^-$ represents a strongly acidic ion.

Preferably, $R^1$ and $R^2$ are independently selected from a hydrogen atom or an optionally-substituted, preferably unsubstituted, alkyl group. Preferably, $R^1$ and $R^2$ represent the same atom or group. Preferably, $R^1$ and $R^2$ represent a hydrogen atom.

Preferred first polymeric materials may be prepared from any of the compounds described on page 3 line 8 to line 39 of GB2030575B by the method described in WO98/12239 and the contents of the aforementioned documents are incorporated herein by reference.

Said first polymeric material may be of formula

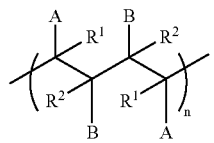

wherein A, B, $R^1$ and $R^2$ are as described above and n is an integer. Integer n is suitably 10 or less, preferably 8 or less, more preferably 6 or less, especially 5 or less. Integer n is suitably at least 1, preferably at least 2, more preferably at least 3.

Preferably, said second polymeric material includes a functional group which is able to react with said first polymeric material in a condensation reaction so that covalent bonds are formed between said first and second polymeric materials. Preferably, a third polymeric material is formed on reaction of said first and second polymeric materials.

Preferably, formation of said third polymeric material from said first and second polymeric materials involves a condensation reaction. Preferably, formation of said third polymeric material involves an acid catalysed reaction. Preferably, said first and second polymeric materials include functional groups which are arranged to react, for example to undergo a condensation reaction, thereby to form said third polymeric material. Preferably, said first and second polymeric materials include functional groups which are arranged to react for example to undergo an acid catalysted reaction thereby to form said third polymeric material.

Preferably, said second polymeric material includes a functional group selected from an alcohol, carboxylic acid, carboxylic acid derivative, for example an ester, and an amine group. Said second polymeric material preferably includes a backbone comprising, preferably consisting essentially of carbon atoms. The backbone is preferably saturated. Pendent from the backbone are one or more said functional groups described. Said polymer may have a molecular weight of at least 10,000. Said second polymeric material is preferably a polyvinyl polymer. Preferred second polymeric compounds include optionally substituted, preferably unsubstituted, polyvinylalcohol, polyvinylacetate, polyalkylene glycols, for example polypropylene glycol, and collagen (and any component thereof). Said second polymeric material could be a copolymer wherein at least one component thereof has the features described above for said second polymeric material. Said second polymeric material is preferably a polyvinylalcohol.

Said third polymeric material suitably includes a moiety of formula

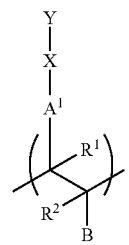

wherein $R^1$, $R^2$ and B are as described above, $A^1$ represents a residue of group A described above after the reaction involving said first and second polymeric materials, Y represents a residue of said second polymeric material after said reaction involving said first and second polymeric materials and X represents a linking atom or group extending between the residues of said first and second polymeric materials. In one preferred embodiment $A^1$ represents an optionally-substituted phenyl group, X represents a group

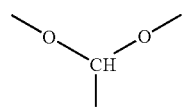

which is bonded via the oxygen atoms to a residue of said second polymeric material. For example, group X may be bonded to the polymer backbone of said second polymeric material.

Thus, said method preferably includes the step of causing said first and second polymeric materials to react thereby to form said third polymeric material.

Said first phase preferably comprises, more preferably consists essentially of, water. Thus, preferably, the ratios of the weights of first and second polymeric materials expressed in paragraphs (c) and (d) of said first aspect refer to the weights of first and second polymeric materials relative to the amount of water present.

In the method of the first aspect, the ratio of the weight of said first polymeric material to the weight of said first phase may be equal to or less than 0.0020, is suitably equal to or less than 0.0015 and is preferably equal to or less than 0.001. In some cases, said ratio may be less than 0.0005. The ratio is suitably at least 0.00005 and is preferably at least 0.00010.

The ratio of the weight of said second polymeric material to the weight of said first phase may be equal to or less than 0.030, is suitably equal to or less than 0.026, is preferably equal to or less than 0.020 and is more preferably equal to or less than 0.010. The ratio is suitably at least 0.001, preferably at least 0.005 more preferably at least 0.0055.

Suitably, the ratio of the weight of said second polymeric material to said first polymeric material is in the range 10 to 100. Said ratio may be at least 15, preferably at least 20. In some cases, it may be at least 30. Said ratio may be less than 90, preferably less than 80. In some cases it may be less than 70.

As described above, a third polymeric material is suitably formed by reaction of said first and second polymeric materials. Suitably, the ratio of the weight of said third polymeric material to the weight of said first phase is equal to or less than 0.0375. Preferably, said ratio is equal to or less than 0.03, more preferably equal to or less than 0.025, especially equal to or less than 0.02. Said ratio may be at least 0.001, preferably at least 0.05.

The method may be used to disperse wide ranging amounts of said first material in said first phase. The ratio of the weight of said first material to the weight of said first polymeric material may be in the range 200–3200. Said ratio may be at least 300, preferably at least 350. Said ratio may be less than 3000, preferably less than 2500, more preferably 2000 or less.

The ratio of the weight of said first material to the weight of said second polymeric material may be in the range 5 to 80. Said ratio may be at least 6, and is preferably at least 8. Said ratio may be less than 70 and is preferably 60 or less.

The wt % of said first phase contacted with said first material and said first and second polymeric materials in the method may be at least 10 wt %, preferably at least 15 wt %. In many cases, the wt % is at least 20 wt %. Said wt % of said first phase is preferably 80 wt % or less.

The wt % of said first material contacted with said first phase and said first and second polymeric materials in the method may be at least 20 wt %. Said wt % may be 85 wt % or less.

The wt % of said first polymeric material contacted with said first phase, said first material and said second polymeric material in said method may be at least 0.020 wt %. Said wt % may be 0.1 wt % or less.

The wt % of said second polymeric material contacted with said first phase, said first material and said first polymeric material may be at least 1 wt %. Said wt % may be 3 wt % or less, preferably 2.5 wt % or less.

Said first material may be any material which is immiscible with said first phase, especially water. Said first material may be a liquid or a solid under the conditions wherein said first phase and first material are contacted. Said first material is suitably a liquid or a solid at 25° C. and atmospheric pressure. Where said first material is a liquid it may be a liquid phase organic material or it could be a liquid phase inorganic material. Where said first material is a solid, said solid is immiscible with said first phase, especially water and, preferably, is in a finely divided form such as in a powder form. Said first material is preferably a liquid under the conditions wherein it is contacted with said first phase.

Said first material may comprise an oil. It may be a mineral, silicone or vegetable oil or any other type of oil. Said first material may comprise an active ingredient, for example an active pharmaceutical or herbicidal ingredient.

In the method of said first aspect, said first phase, said first material, said first polymeric material and said second polymeric material may be contacted and mixed together, suitably using high shear mixing. This may be carried out at ambient temperature and pressure. Preferably, in the method, said first phase, said first polymeric material and said second polymeric material are initially contacted, preferably with mixing. Then, a mixture comprising said first phase, said first polymeric material and said second polymeric material is preferably mixed with said first material. The mixing with said first material is believed to result in the formation of a layer comprising said first and second polymeric materials between said first phase and first material. For example, said first and second polymeric materials may be adsorbed upon the first material. Preferably, subsequent to the initial contact of the aforementioned materials, steps may be taken to promote the reaction of said first and second polymeric materials. This may be effected by adjusting the pH, for example lowering the pH, of the mixture comprising said first phase, first material and said first and second polymeric materials. Suitably, an acid, for example a protic acid, is added to the mixture to lower the pH, is suitably to less than 0.4, preferably less than 3, more preferably less than 2. The pH is suitably greater than 1 after addition of said acid. It is believed that, after reaction, the third polymeric material formed as described above, surrounds, suitably encapsulates, particles and/or droplets of said first material and said particles and/or droplets are dispersed throughout said first phase. Optionally, the mixture may subsequently be neutralised by addition of a base.

The form and/or consistency of the mixture after formation of said third polymeric material will vary according to the composition of the mixture. When the ratio of the weight of said first material to that of said first phase (initially contacted in the method) is relatively high (e.g. greater than 3 or greater than 4) then the mixture may have a relatively thick consistency (e.g. like thick cream). On the other hand, when said ratio is lower (e.g. less than 1.5), the viscosity may be much less.

The mixture may be further treated after formation of said third polymeric material. Water may be removed from the mixture for example by drying. This may result in the formation of dry particles of said first material and associated third polymeric material. The dry particle may be re-hydratable and/or re-dispersible by addition of water.

The relative amounts of said first and second polymeric material used in the preparation of said third polymeric material can be adjusted to vary the properties of dried particles of the type described. For example, as the amount of said first polymeric material used is increased, the coating of said third polymeric material around said first material may be tougher. For relatively low levels of said first polymeric material, said coating of said third polymeric material may be relatively soft. Additionally, in general, the longer the reaction time of said first and second polymeric materials, the tougher the coating produced.

According to a second aspect of the invention, there is provided a method of preparing a dispersion which includes the step of contacting a first phase, a first material immiscible therewith, a first polymeric material as described according to said first aspect (for example having a repeat unit of formula I) and a second polymeric material which includes a functional group as described according to said first aspect, wherein:
(a) the ratio of the weight of said second polymeric material to the weight of said first polymeric material is in the range 10 to 100; or
(b) the ratio of the weight of said first material to the weight of said first polymeric material is in the range 200–3200; and the ratio of the weight of said first material to the weight of said second polymeric material is in the range 8 to 80.

According to a third aspect of the invention, there is provided a method of preparing a dispersion comprising a first phase and a first material immiscible therewith, the method comprising contacting said first phase and said first material with:
(a) a first polymeric material as described according to said first aspect (for example having a repeat unit of formula I) and a second polymeric material which includes a functional group as described according to said first aspect, wherein a third polymeric material is formed by reaction of said first and a second polymeric materials; or
(b) a third polymeric material which includes a moiety of formula

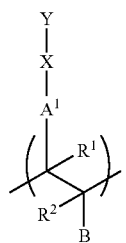

wherein $R^1$, $R^2$ and B are as described above, $A^1$ represents a residue of group A described above, Y represents a residue of a said second polymeric material and X represents a linking atom or group extending between the residues of groups A and Y;
wherein the ratio of the weight of said third polymeric material to the weight of said first phase is equal to or less than 0.0375.

According to a fourth aspect of the invention, there is provided a dispersion comprising a first phase, a first material immiscible therewith, a first polymeric material as described according to said first aspect (for example having a repeat unit of formula I) and a second polymeric material which includes a functional group as described according to said first aspect, wherein:
(a) the ratio of the weight of said first polymeric material to the weight of said first phase is equal to or less than 0.0025 and the ratio of the weight of said second polymeric material to the weight of said first phase is equal to or less than 0.035; or
(b) the ratio of the weight of said second polymeric material to the weight of said first polymeric material is in the range 10 to 100; or
(c) the ratio of the weight of said first material to the weight of said first polymeric material is in the range 200–3200 and the ratio of the weight of said first material to the weight of said second polymeric material is in the range 8 to 80.

According to a fifth aspect of the invention, there is provided a dispersion comprising a first phase, a first material immiscible therewith and a third polymeric material which includes a moiety of formula

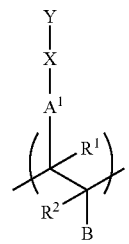

wherein $R^1$, $R^2$ and B are as described above, $A^1$ represents a residue of group A described above, Y represents a residue of a second polymeric material and X represents a linking atom or group extending between residues Y and $A^1$, wherein the ratio of the weight of said third polymeric material to the weight of said first phase is equal to or less than 0.0375.

$A^1$ preferably represents an optionally-substituted phenyl group and X represents a group

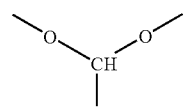

which is bonded via the oxygen atoms to a residue of said second polymeric material.

Any feature of any aspect of any invention described above may be combined with any feature of any aspect of any other invention or embodiment mutatis mutandis.

Specific examples of the invention will now be described, by way of example.

EXAMPLE 1

Preparation of poly (1,4-di(4-(N-methylpyridinyl))-2,3-di(4-(1-formylphenyl)butylidene This was prepared as described in Example 1 of PCT/GB97/02529, the contents of which are incorporated herein by reference. In the method, an aqueous solution of greater than 1 wt % of 4-(4-formylphenylethenyl)-1-methylpyridinium methosulphonate (SbQ) is prepared by mixing the SbQ with water at ambient temperature. Under such conditions, the SbQ molecules form aggregates. The solution was then exposed to ultraviolet light. This results in a photochemical reaction between the carbon-carbon double bonds of adjacent 4-(4-formylphenylethenyl)-1-methylpyridinium methosulphate molecules (I) in the aggregate, producing a polymer, poly (1,4-di(4-(N-methylpyridinyl))-2,3-di(4-(1-formylphenyl)butylidene methosulphonate (II), as shown in the reaction scheme below. It should be appreciated that the anions of compounds I and II have been omitted in the interests of clarity.

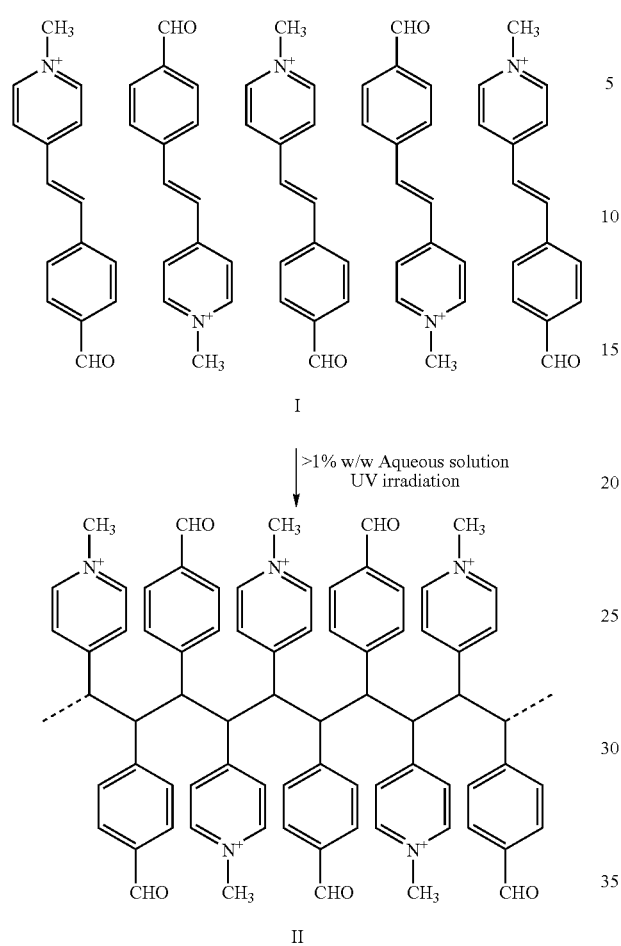

I

>1% w/w Aqueous solution
UV irradiation

II

EXAMPLE 2

General Procedure for Preparation of Water Insoluble Material-in-Water Micro-Emulsion A water insoluble material, for example a non-polar material, is mixed with an aqueous formulation comprising the polymer of Example 1 and poly(vinyl alcohol) (e.g. 88% hydrolysed polyvinylalcohol of molecular weight 300,000) using high shear stirring at ambient temperature. This has the effect of emulsifying the water insoluble material as micro droplets which are stabilised by adsorbing a layer, for example an approximately monomolecular layer, of the polymer of Example 1 and the poly(vinylalcohol). The two polymers in the layer are then caused to react in an acid catalysed reaction to produce a hydrogel layer which encapsulates the water insoluble material. The formation of the hydrogel is summarised in the scheme below.

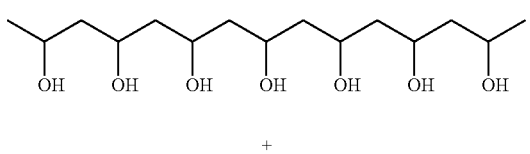

+

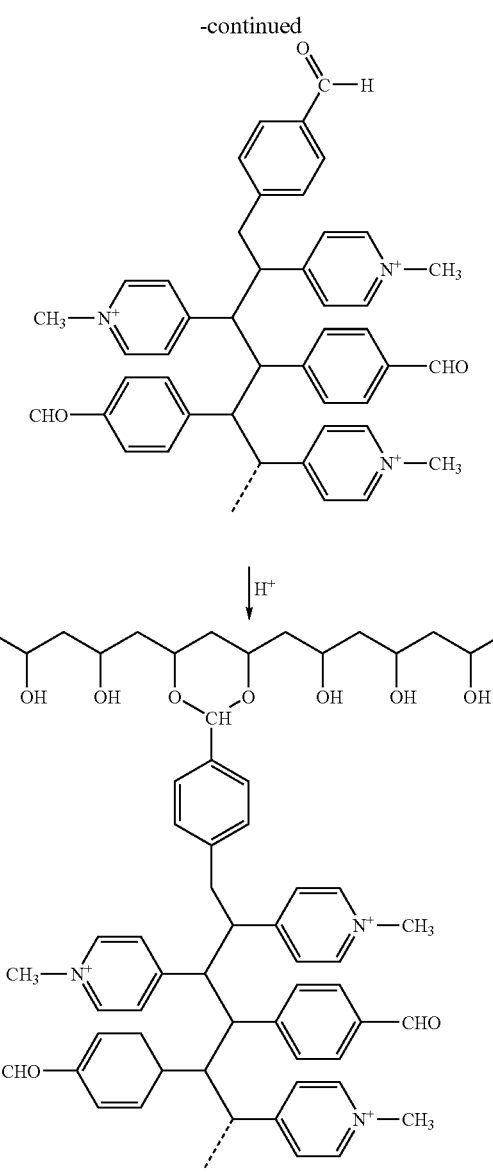

Preferred micro-emulsions may be made using aqueous formulations comprising up to 0.1 wt %, for example 0.025 to 0.1 wt % of the polymer of Example 1 and up to 2.5 wt %, for example 1 to 2.5 wt % of polyvinylalcohol. Such aqueous formulations may be used to form micro-emulsions with up to 75 wt % of water insoluble materials—that is up to 75 wt % of water insoluble material and 25 wt % or more of an aqueous formulation of the type described may be used.

EXAMPLE 3

Emulsification of Heavy Crude Oil 25 g of an aqueous formulation comprising 0.05 wt % of the polymer of Example 1 and 2 wt % of polyvinylalcohol as referred to in Example 2 (the balance being water) was mixed, under high shear, with 75 g of crude oil. 5 ml of 5% hydrochloric acid solution was then added to reduce the pH to about 1.8. Stirring was then continued and, as a result, very small droplets comprising encapsulated oil were formed. Whilst the emulsion formed was relatively thick, addition of water reduced the viscosity without destabilisation of the micro-emulsion.

EXAMPLE 4

Emulsification of Crude Oil

The procedure of Example 3 was followed except that 50 g of heavy crude oil was emulsified. In this case, an emulsion with lower viscosity than in Example 3 and a wide variation in droplet sizes was produced.

EXAMPLE 5

Emulsification of Herbicides 50 g of the aqueous formulation described in Example 3 was mixed, under high shear, with a liquid consisting of an water insoluble organic herbicidal ingredient (50 wt %) so as to emulsify the herbidical ingredient. The mixture was acidified to pH 1.8 using 5% hydrochloric acid solution and stirring continued for one hour. Then the mixture was neutralised using NaOH solution. (The neutralisation stops the acid catalysed reaction between the polymers). The material formed was allowed to dry in air and a sample was observed under a microscope whilst drying on a microscope slide. It was found that the material burst on drying.

EXAMPLE 6

Emulsification of Herbicides

The procedure of Example 5 was followed except that instead of neutralising the mixture after 1 hour, the mixture was neutralised using NaOH solution after 5 hours. The formulation was then allowed to dry and observed under a microscope as described in Example 5.

In this example, it was found that the material retained its integrity on drying and could be rehydrated, for example by dropping water onto the slide.

Examples 7 to 12 illustrate how preparatory procedures may be varied to adjust properties of micro-emulsions and materials produced therefrom. The liquid paraffin referred to was medicinal grade liquid paraffin. It was selected as being representative of a water insoluble material.

EXAMPLE 7

Following the procedure described generally in Example 2, 80 wt % of an aqueous formulation comprising 0.05 wt % of the polymer of Example 1 and 3 wt % of the polyvinyl alcohol referenced in Example 2 was mixed with 20 wt % liquid paraffin. Then, 7% HCl was mixed in to reduce the pH to about 1.8 and, as a result, a stable micro-emulsion formed. On drying in air and examination as described in Example 5 the droplets burst.

EXAMPLE 8

The procedure of Example 7 was used except that 50 wt % liquid paraffin was emulsified. A stable micro-emulsion was produced after addition of the acid. On drying as described in Example 5, the material produced did not burst but dry particles of encapsulated liquid paraffin were produced. These particles could be rehydrated easily.

EXAMPLE 9

The procedure of Example 8 was followed except that an aqueous formulation comprising 0.75 wt % of the polymer of Example 1 and 3 wt % of the polyvinyl alcohol were used. The micro-emulsion behaved substantially as described in Example 8.

EXAMPLE 10

The procedure of Example 8 was followed using 50 wt % liquid paraffin except that an aqueous formulation comprising 0.05 wt % of the polymer of Example 1 and 1 wt % of polyvinylalcohol referred to in Example 2 was used. An emulsion was formed with larger sized droplets. It was found that an emulsion could be formed in this way with up to 85 wt % liquid paraffin. With 85 wt % liquid paraffin, it was found that after addition of 7% HCl to reduce the pH to about 1.8, followed by standing overnight, the emulsion became solid.

EXAMPLE 11

The procedure of Example 8 was followed except that neutralisation using NaOH took place 3 hours after acidification. (It should be noted that in the procedure of Example 8 there is no base neutralisation step). On drying as described above, the material was found to burst.

EXAMPLE 12

The procedure of Example 8 was followed modified in a manner analogous to that described in Example 11. In this case, also, on drying the material was found to burst.

Examples 13 and 14 describe the use of diesel oil as the non-polar material.

EXAMPLE 13

Following the procedure described generally in Example 2, 25 wt % of an aqueous formulation comprising 0.05 wt % of the polymer of Example 1 and 2 wt % of the polyvinylalcohol referenced in Example 2 were mixed with 75 wt % of diesel oil and the mixture sheared. After addition of acid to reduce the pH to about 1.8, a micro-emulsion formed with the consistency of thick cream. This formulation was found to burn very easily. Such a formulation could be used as a replacement for known diesel oil/water mixtures used in combustion since the emulsified oil may burn more easily.

EXAMPLE 14

The procedure of Example 13 was followed except that 50 wt % of diesel oil was emulsified. A thick cream was produced. In this case, it was found that the material produced would not burn. Such a material may be used for safely transporting diesel fuel (or other inflammable liquids such as acetone, ether, xylene etc) since when encapsulated in a micro-emulsion as described, the materials do not represent a significant fire hazard.

EXAMPLE 15

General Procedure for Destroying Microemulsions

The microemulsions described may be broken down by use of a periodate salt which acts to split the poly(vinylalcohol) chains. Thus, this process may be applied, for example, to the thick cream of Example 14. On treatment, the diesel oil separates from the other components and may be isolated.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of preparing an aqueous microemulsion which includes the step of contacting a first phase, a first material immiscible therewith, a first polymeric material and a second polymeric material wherein:
   (a) (i) said first polymeric material has a repeat unit of the formula

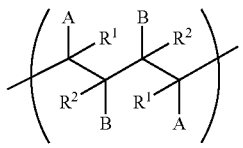

I wherein A and B are the same or different, are selected from optionally-substituted aromatic and heteroaromatic groups and at least one comprises a relatively polar atom or group and $R^1$ and $R^2$ independently comprise relatively non-polar atoms or groups; or
   (ii) said first polymeric material is prepared or preparable by providing a compound of general formula

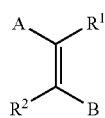

wherein A, B, $R^1$ and $R^2$ are as described above, in an aqueous solvent and causing the groups C=C in said compound to react with one another to form said first polymeric material;
   (b) said second polymeric material includes a functional group which is able to react with said first polymeric material so that covalent bonds are formed between said first and second polymeric materials;
   (c) the ratio of the weight of said first polymeric material to the weight of said first phase is equal to or less than 0.0025;
   (d) the ratio of the weight of said second polymeric material to the weight of said first phase is equal to or less than 0.035; and
   (e) said first phase comprises water.

2. A method according to claim 1, wherein A and B do not include carbon and hydrogen atoms only.

3. A method according to claim 1, wherein at least one of A or B includes a functional group which can undergo a condensation reaction.

4. A method according to claim 1, wherein one of groups A and B includes a substituent which includes a carbonyl or acetyl group.

5. A method according to claim 4, wherein the other one of groups A and B includes a substituent which is an alkyl group.

6. A method according to claim 1, wherein A represents a group substituted by a formyl group or substituted by a group of general formula;

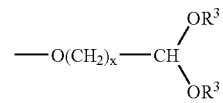

II wherein x is an integer from 1 to 6 and each $R^3$ is independently an alkyl or phenyl group or together form an alkalene group.

7. A method according to claim 6, wherein B represents an optionally substituted heteroaromatic group substituted on the heteroatom with a hydrogen atom or an alkyl or aralkyl group.

8. A method according to claim 1, wherein $R^1$ and $R^2$ are independently selected from a hydrogen atom or an optionally substituted alkyl group.

9. A method according to claim 1, wherein $R_1$ and $R_2$ represent the same atom or group.

10. A method according to claim 1, wherein said second polymeric material includes a functional group which is able to react with said first polymeric material in a condensation reaction so that a covalent bond is formed between said first and second polymeric materials.

11. A method according to claim 1, wherein said second polymeric material includes a functional group selected from an alcohol, carboxylic acid, carboxylic acid derivative and an amine group.

12. A method according to claim 1, wherein said second polymeric material is a polyvinyl polymer.

13. A method according to claim 1, wherein said second polymeric material is an optionally-substituted polyvinyl alcohol, polyvinylacetate or polyalkylene glycol.

14. A method according to claim 1, wherein a third polymeric material is formed by reaction of said first and second polymeric materials, wherein said third polymeric material includes a moiety of formula

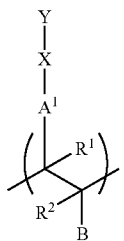

wherein $R^1$, $R^2$ and B are as described above, $A^1$ represents a residue of group A described above after the reaction involving said first and second polymeric materials, Y represents a residue of said second polymeric material after said reaction involving said first and second polymeric materials and X represents a linking atom or group extending between the residues of said first and second polymeric materials.

15. A method according to claim 1, wherein the ratio of the weight of said first polymeric material to the weight of said first phase is equal to or less than 0.0020 and is at least 0.00005.

16. A method according to claim 1, wherein the ratio of the weight of said first polymeric material to the weight of said first phase is at least 0.00010 and is equal to or less than 0.0015.

17. A method according to claim 1, wherein the ratio of the weight of said second polymeric material to the weight of said first phase is equal to or less than 0.030 and is at least 0.001.

18. A method according to claim 16, wherein the ratio of the weight of said second polymeric material to the weight of said first phase is equal to or less than 0.020 and is at least 0.005.

19. A method according to claim 1, wherein the ratio of the weight of said second polymeric material to said first polymeric material is in the range 10 to 100.

20. A method according to claim 18, wherein the ratio of the weight of said second polymeric material to said first polymeric material is at least 20 and is less than 90.

21. A method according to claim 1, wherein the ratio of the weight of a third polymeric material which is formed by reaction of said first and second polymeric materials to the weight of said first phase is equal to or less than 0.0375.

22. A method according to claim 1, wherein the ratio of the weight of said first material to the weight of said first polymeric material is in the range 200 to 3,200.

23. A method according to claim 20, wherein the ratio of the weight of said first material to the weight of said first polymeric material is at least 350 and is 2000 or less.

24. A method according to claim 1, wherein the ratio of the weight of said first material to the weight of said second polymeric material is in the range 5 to 80.

25. A method according to claim 1, wherein the wt % of said first phase contacted with said first material and said first and second polymeric materials in the method is at least 10 wt % and is 80 wt % or less.

26. A method according to claim 1, wherein the wt % of said first phase contacted with said first material and said first and second polymeric materials in the method is at least 10 wt % and 80 wt % or less; and the wt % of said first material contacted with said first phase and said first and second polymeric materials in the method is at least 20 wt % and is 85 wt % or less and the wt % of said first polymeric material contacted with said first phase, said first material and said second polymeric material in the method is at least 0.020 wt % and is 0.1 wt % or less; and the wt % of said second polymeric material contacted with said first phase, said first material and said first polymeric material is at least 1 wt % and is 3 wt % or less.

27. A method according to claim 1, wherein said first material is immiscible with water.

28. A method according to claim 1, wherein said first material is an oil.

29. A method according to claim 1, wherein said first phase, said first material, said first polymeric material and said second polymeric material are contacted and mixed together.

30. A method according to claim 29, wherein the mixture is treated after formation of said third polymeric material to remove water therefrom.

31. A method according to claim 1, wherein said first polymeric material is as described in (a) (i).

32. An aqueous microemulsion comprising a first phase which comprises water, a first material immiscible therewith, a first polymeric material and a second polymeric material wherein said first polymeric material has a repeat unit of the formula

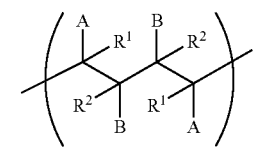

I wherein A and B are the same or different, are selected from optionally-substituted aromatic and heteroaromatic groups and at least one comprises a relatively polar atom or group and $R^1$ and $R^2$ independently comprise relatively non-polar atoms or groups;

said second polymeric material includes a functional group which is able to react with said first polymeric material so that covalent bonds are formed between said first and second polymeric materials;

wherein:

(a) the ratio of the weight of said first polymeric material to the weight of said first phase is equal to or less than 0.0025 and the ratio of the weight of said second polymeric material to the weight of said first phase is equal to or less than 0.035; or (b) the ratio of the weight of said second polymeric material to the weight of said first polymeric material is in the range 10 to 100; or (c) the ratio of the weight of said first material to the weight of said first polymeric material is in the range 200–3200 and the ratio of the weight of said first material to the weight of said second polymeric material is in the range 8 to 80.

33. An aqueous microemulsion according to claim 32, wherein the ratio of the weight of said first polymeric material to the weight of said first phase is equal to or less than 0.0020 and is at least 0.00005.

34. An aqueous microemulsion according to claim 32, wherein the ratio of the weight of said first polymeric material to the weight of said first phase is at least 0.00010 and is equal to or less than 0.0015.

35. An aqueous microemulsion according to claim 32, wherein the ratio of the weight of said second polymeric material to the weight of said first phase is equal to or less than 0.030 and is at least 0.001.

36. An aqueous microemulsion according to claim 32, wherein the ratio of the weight of said second polymeric material to the weight of said first phase is equal to or less than 0.020 and is at least 0.005.

37. An aqueous microemulsion according to claim 32, wherein the ratio of the weight of said first polymeric material to the weight of said first phase is equal to or less than 0.0020 and is at least 0.00005; and the ratio of the weight of said second polymeric material to the weight of said first phase is equal to or less than 0.020 and is at least 0.005.

* * * * *